Patented Feb. 10, 1925.

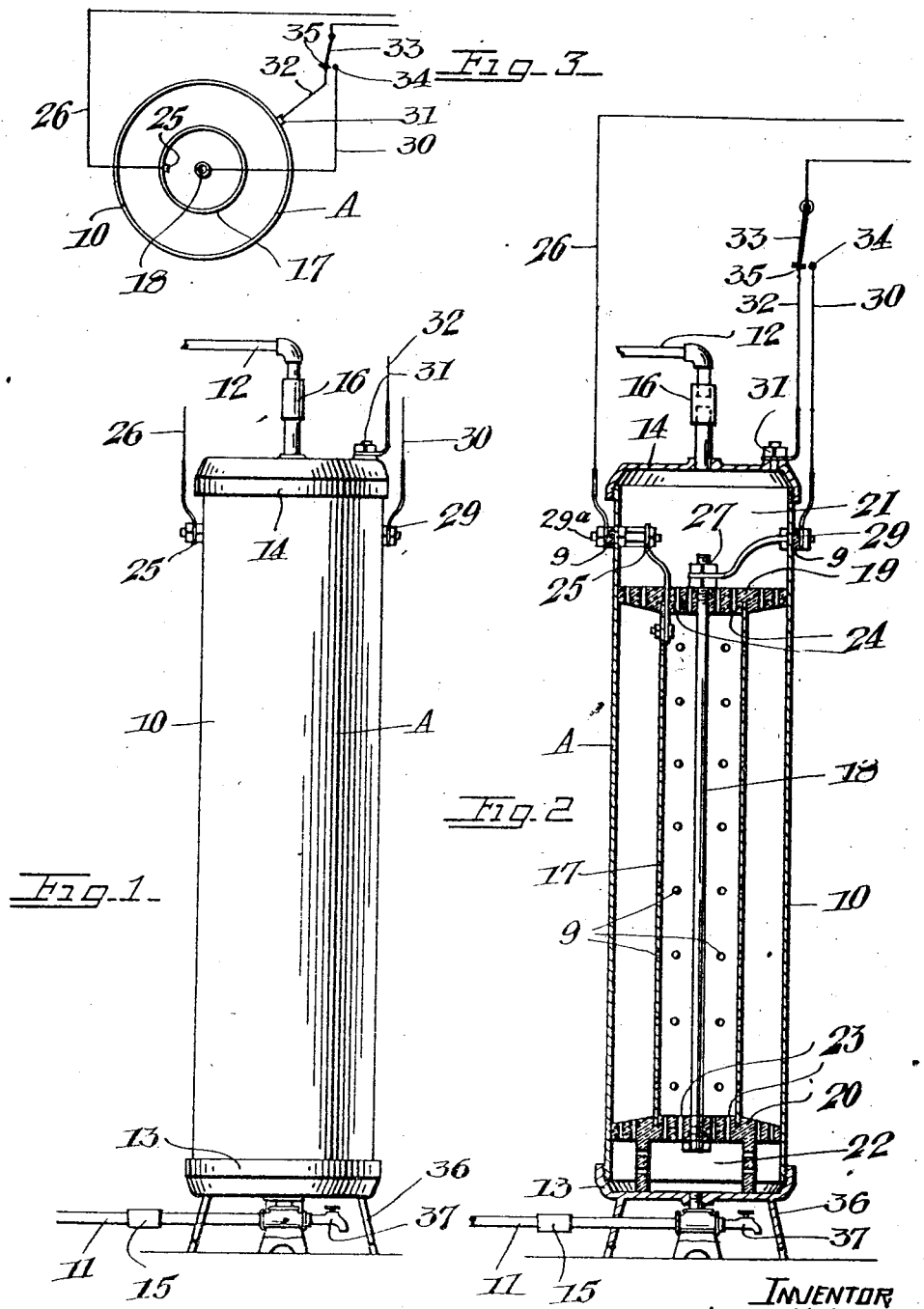

1,525,508

UNITED STATES PATENT OFFICE.

JOHN McCORMICK, OF OTTAWA, ONTARIO, CANADA.

ELECTRIC WATER HEATER.

Application filed July 5, 1923. Serial No. 649,643.

*To all whom it may concern:*

Be it known that I, JOHN McCORMICK, a subject of the King of Great Britain, and resident of the city of Ottawa, in the Province of Ontario and Dominion of Canada, have invented certain new and useful Improvements in Electric Water Heaters, of which the following is a specification.

This invention relates to improvements in electric water heaters, and the objects of the invention are to provide a simple and economically constructed device of this kind with which better and quicker results in the heating of water will be obtained, with a minimum consumption of power.

A further object is to provide a device of this character that can be readily marketed in large quantities at low cost.

With these and other objects in view, the invention consists essentially in the novel construction and arrangement of parts as described in the present specification and illustrated by the accompanying drawings which form a part of the same.

Referring now to the drawings in which like characters of reference indicate corresponding parts in each figure:

Figure 1 is an enlarged view of an embodiment of my invention.

Figure 2 is a vertical section.

Figure 3 is a top plan view showing the arrangement of the electric switch.

In the drawings, A designates the device as a whole, comprising an outer tubular member 10 connected through a water supply pipe 11 with a tank or the like and provided at the top with the return water pipe 12.

These pipes extend through caps 13 and 14 on each end of the tubular member 10, the pipe connections being suitably insulated at the connecting points 15 and 16, Within the tubular member I provide a second tube 17 and within the tube 17 a further tube 18 of lesser diameter. The tubes are insulated from one another at each end by suitable insulating plates 19 and 20, into which they fit and which are arranged adjacent each end in the tube, so as to provide between them and the end caps 13 and 14 suitable spaces 21 and 22.

These insulating plates 19 and 20 are provided with a plurality of openings 23 and 24, whereby the water circulates from the space 22 into the tubes and then into the space 21, and so on.

The tubes 10, 17 and 18 are designed to form electrodes and for this purpose I provide binding posts 29 and 29ª on the outer tube, connected to binding posts 25 and 27 for the intermediate tube 17 and the inner tube 18, respectively. 31 is a binding post on the cap 14, connected to a lead 32 interrupted by a switch 33, adapted to contact with the lead 30 connected to the binding post 29, the binding post 29ª being connected to a lead 26. The posts 29 and 29ª are suitably insulated at 9 from the tube 10.

9 are a plurality of holes in the inner tube for the water to circulate through.

In operation it will be seen that in the arrangement of the wiring when the switch 33 is in the position as shown in Figure 2, contacting with the lead 32 at 35, the outer tube 10 and the inner tube 17 will be energized, that when the switch is moved to contact with the points 34 and 35 the three tubes 10, 17 and 18 will be heated, while on the switch being further moved to contact only with the point 34, the outer tube 10 and the innermost tube 18 will be heated.

These tubes, as previously mentioned, are completely insulated from one another through the insulating plates 19 and 20; and therefore the water circulating therein forms the resistance to convey the current, and thus materially increases the efficiency and economic operation of my heater.

36 is a suitable stand for the heater, insulated therefrom, formed integral with the cap.

37 is a tap in the pipe 11 for draining the sediment.

The tube 10 is preferably provided on the outside with a suitable covering of insulating material, so that the heater can be readily handled.

It may be mentioned that the inner tube 17 is continually heated, and the switch 33 is operated to heat, in addition, the outer tube and the innermost tube.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not a limiting sense.

What I claim as my invention is:

1. An electric water heater comprising a tubular container provided with suitable caps screw-secured at each end, side binding posts for said container, an intermediate and an inner spaced tube electrode having binding posts at their upper end connected to the side binding posts, a binding post on the cover of the container, insulating plates at each end on said electrodes, openings in said plates, adapted for the water to circulate therethrough, water intake and discharge means on the top and bottom of the heater, respectively, a plurality of orifices in the intermediate tube, adapted for the circulation of water therethrough.

2. An electric heater of the character described comprising a plurality of spaced tube electrodes, screw cap means at each end of the outer tube, water intake and discharge means in said caps, the intermediate and inner of said electrodes extending adjacent the top of the outer tube electrode, insulating plates for said electrodes, and water circulating means in said electrodes, whereby on the tubes being charged the water forms a resistance, side binding posts on the outer electrode, and binding posts on the intermediate and inner tube electrode, connected to said binding posts, a binding post on the cover of the outer tube electrode, and means for electrically connecting the binding posts to the source of power, and switch means for charging the tube electrodes separately or collectively and for controlling the charge of said tubes.

3. An electric heater of the character described comprising a suitably insulated casing, a plurality of spaced tubes in said casing, adapted to form electrodes, top and bottom cap means having water intake and discharge means therein for the outer tube, binding posts for the outer tube, communicating with binding posts on the top of the intermediate and inner tube, and water circulating orifices in the intermediate tube, insulating plates for said tubes, and water circulating orifices in said plates, a third binding post for the heater, and means connecting said binding post with switch means, and means connecting the side binding posts with said switch means, whereby the tubes are charged separately or collectively.

In witness whereof I have hereunto set my hand in the presence of two witnesses.

JOHN McCORMICK.

Witnesses:
W. T. QUINN,
M. E. KNOX.